United States Patent [19]
Muntz

[11] 3,943,282
[45] Mar. 9, 1976

[54] PROJECTION TELEVISION APPARATUS

[76] Inventor: Earl W. Muntz, 16134 Covello St., Van Nuys, Calif. 91406

[22] Filed: Jan. 13, 1975

[21] Appl. No.: 540,312

[52] U.S. Cl. ............................. 178/7.91; 178/7.88
[51] Int. Cl.² ............................................. H04N 5/74
[58] Field of Search ................. 178/7.88, 7.89, 7.91

[56]        References Cited
           UNITED STATES PATENTS 2,186,570   1/1940   Batchelor .......................... 178/7.91

FOREIGN PATENTS OR APPLICATIONS 436,301   10/1935   United Kingdom ................ 178/7.91

*Primary Examiner*—Howard W. Britton
*Attorney, Agent, or Firm*—Keith D. Beecher

[57]             ABSTRACT

An improved television system and apparatus is provided in which a large size image is projected from the face of a cathode-ray tube viewing screen to a larger display screen. The display screen is mounted in an essentially vertical position on top and to the rear of a cabinet. A television receiver is mounted within the cabinet, and an optical system is provided which projects an enlarged image from the viewing screen of the television receiver to the enlarged display screen. The optical system includes a mirror positioned in a drawer, which is mounted in the cabinet, and which may be opened to draw the mirror into the proper position so that an enlarged image is projected over the entire surface of the display screen. The apparatus has the feature of being of a relatively narrow width, especially when not in use and when the drawer is closed.

2 Claims, 2 Drawing Figures

PROJECTION TELEVISION APPARATUS

BACKGROUND OF THE INVENTION

Television systems and apparatus in which images are projected onto an enlarged display screen are known. However, the prior art system, for the most part, are excessively complex and bulky, so as to render the prior art apparatus unsuitable for use in the usual home. The unit of the present invention, however, is constructed to have a relatively narrow width and to be compact, and yet to include all the optical elements necessary to provide a bright enlarged image on a display screen, the image being exhibited in excellent detail and being subject to side angle viewing.

DETAILED DESCRIPTION OF THE ILLUSTRATED EMBODIMENT

Figure 2:
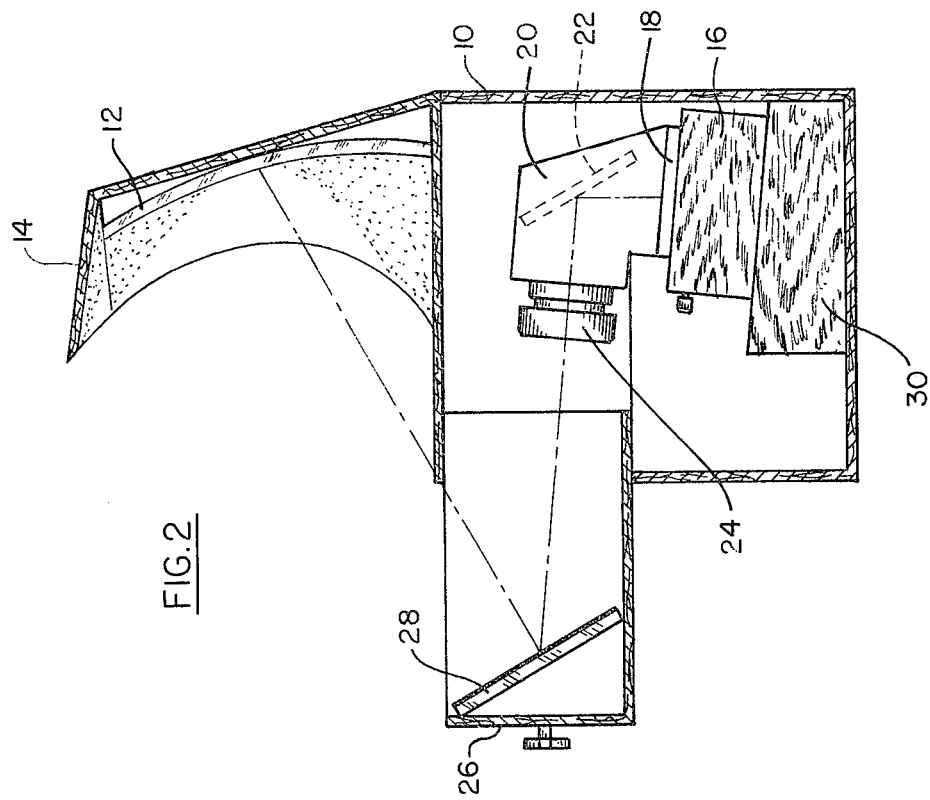
FIG. 2 is a side sectional view, taken essentially along the line 2—2 of FIG. 1.
Figure 1:
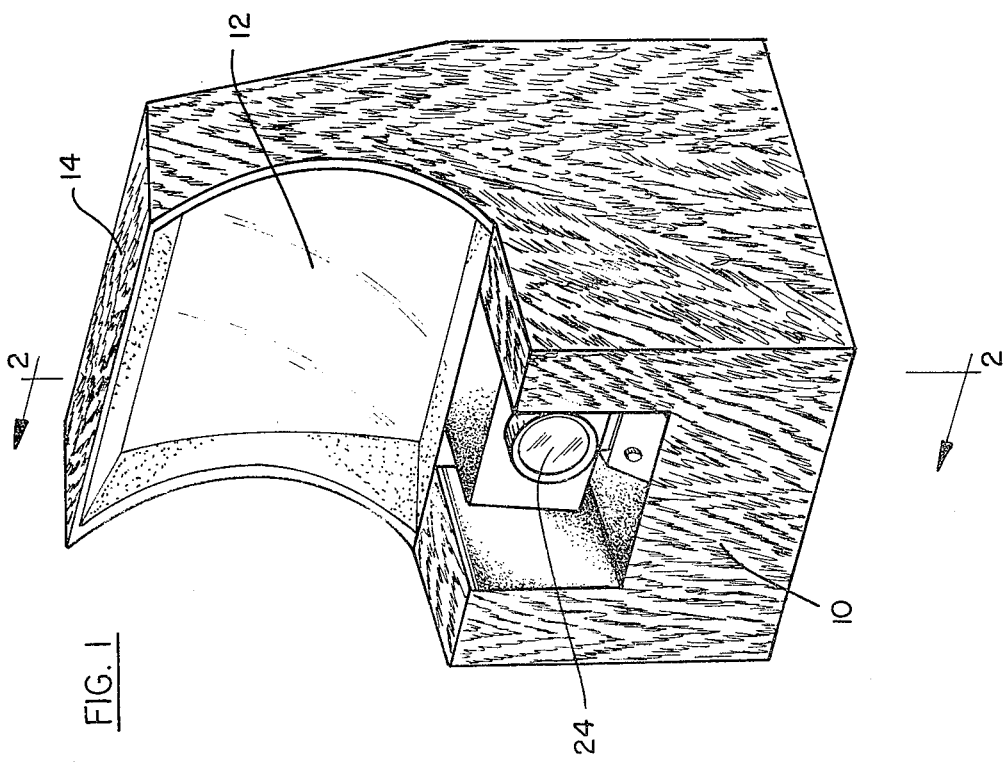
FIG. 1 is a front perspective view of apparatus constructed to incorporate the concepts of the invention, in accordance with one embodiment.

The projection television apparatus, as shown in the drawing includes a cabinet 10, which has a display screen 12 mounted on top of the cabinet along the rear edge thereof. The display screen is surrounded by a shroud 14 which protects it from ambient light. The display screen 12, for example, may be of the type described in the Oct. 1968 issue of the Journal of the Society of Motion Picture and Television Engineers in an article entitled "High-Brightness Projection Screens With High Ambient Light Reflections," and may be of the type presently sold by the Eastman Kodak Company under its trademark "Kodak Ektralite Projection Screen." As shown particularly in FIG. 2, the screen 20 is curved for the reasons described in the aforesaid article. The screen, for example, may have dimensions of the order of 40 × 40 inches.

A television receiver 16 is mounted on a stand 30 in the cabinet 10 with its viewing screen 18 facing upwardly. An optical unit 20 is mounted over the viewing screen 18 of the television receiver, and the optical unit includes a first mirror 22 and a projection lens 24. The mirror 22 reflects the image on the viewing screen 18 of the television receiver along a horizontal optical axis and through the projection lens 24. The mirror 20, for example, may have dimensions of 8 × 10 inches. The lens 24, for example, may be of the type presently marketed by the Eastman Kodak Company under the designation "Aero Extra (f2.5, 305mm)."

A drawer 26 is mounted in the front of the cabinet 10, and it may be slidable in the cabinet, as shown, or it may be tiltable, if so desired. In the illustrated embodiment, the drawer 26 is constructed so that when the apparatus is not in use, it can be moved completely into the cabinet to minimize the overall width of the apparatus. In a constructed embodiment, the depth of the cabinet is 25 inches, and the width of the drawer, when fully extended, is 14 inches.

A mirror 28 is mounted in the front of the drawer 26, and it serves to project the image from the projection lens 24 rearwardly and upwardly to the display screen 12. The mirror 28, for example, may have dimension of 14 × 20 inches. The optical system is designed so that when the drawer 26 is in the extended position shown in FIG. 2, the image projected from the lens 24 is directed to the display screen 12 with a size so that it completely covers the viewing surface of the display screen.

In the constructed embodiment, the sum of the distances between the projection lens 24 and the mirror 20 and from the mirror 20 to the viewing screen of the television receiver is 12 inches; and the sum of the distances between the projection lens 24 and the mirror 28, and the mirror 28 and the screen 12 is 66 inches, when the drawer is extended. It is to be understood that the dimensions and other parameters set forth above are intended merely for descriptive purposes, and are in no way to be construed as limiting the invention in any manner.

A usual remote control unit may be provided for the viewer, so that the station selection and volume of the television receiver 16 may be controlled from the viewing position.

The invention provides, therefore, an improved, compact and simplified projection television system and apparatus, by which enlarged, bright, detailed images are projected onto a display screen by a minimum of optical components, and in a restricted projection space.

It will be appreciated that although a particular embodiment of the invention has been shown and described, modifications may be made. It is intended in the claims to cover all modifications which come within the true spirit and scope of the invention.

What is claimed is:

1. Television apparatus including: a cabinet; a curved display screen mounted in an upright position on top of said cabinet adjacent the rear side thereof to present a concave surface to a viewer; a shroud surrounding the display screen to protect the display screen from ambient light; a television receiver mounted in said cabinet having an upwardly facing viewing screen; an optical unit mounted on said television receiver directly over the viewing screen of the television receiver and including first reflector means and a projection lens for directing images from the viewing screen along a substantially horizontal optical path; a drawer mounted in the front of the cabinet and movable to an open position and to a closed position; and second reflector means mounted in said drawer and disposed in said optical path for directing the images from the viewing screen of the television receiver onto said display screen when the drawer is in its open position and with a size corresponding to the size of said display screen.

2. The television apparatus defined in claim 1, in which said drawer is slidable in said cabinet between its open position and its closed position.

* * * * *

UNITED STATES PATENT OFFICE
CERTIFICATE OF CORRECTION

Patent No. 3,943,282        Dated March 9, 1976

Inventor(s) Earl W. Muntz

It is certified that error appears in the above-identified patent and that said Letters Patent are hereby corrected as shown below:

Column 1, line 40, "20" should read -- 12 --.

line 50, "20" should read -- 22 --.

Column 2, line 15, "20" both occurrences should read -- 22 --.

Signed and Sealed this

Third Day of August 1976

[SEAL]

Attest:

RUTH C. MASON
Attesting Officer

C. MARSHALL DANN
Commissioner of Patents and Trademarks